(12) United States Patent
Bennett

(10) Patent No.: US 8,661,008 B2
(45) Date of Patent: Feb. 25, 2014

(54) NETWORK BROWSER SUPPORTING HISTORICAL CONTENT VIEWING

(75) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 196 days.

(21) Appl. No.: 12/422,486

(22) Filed: Apr. 13, 2009

(65) Prior Publication Data

US 2009/0287658 A1 Nov. 19, 2009

Related U.S. Application Data

(60) Provisional application No. 61/053,260, filed on May 15, 2008.

(51) Int. Cl.
*G06F 17/30* (2006.01)
(52) U.S. Cl.
USPC .......................................... 707/705; 707/821
(58) Field of Classification Search
None
See application file for complete search history.

(56) References Cited

U.S. PATENT DOCUMENTS

| | | | |
|---|---|---|---|
| 6,629,097 B1* | 9/2003 | Keith | 1/1 |
| 2007/0202941 A1* | 8/2007 | Miltenberger et al. | 463/25 |
| 2007/0288589 A1* | 12/2007 | Chen et al. | 709/217 |
| 2011/0066607 A1* | 3/2011 | Wong | 707/706 |

* cited by examiner

*Primary Examiner* — Don Wong
*Assistant Examiner* — Deric Ortiz
(74) *Attorney, Agent, or Firm* — Garlick & Markison; Bruce E. Garlick

(57) ABSTRACT

An Internet infrastructure supports a timed window and version-based historical search service comprising a search server that receives a search string from a client device and a historical data repository from where the historical Internet data is retrieved when searching. A client device has a network browser that accesses a historical data support module that facilitates searching of historical data and displaying the historical Internet data to user. The network browser provides options for inputting a search string, accepting user search preferences, viewing timeline-based historical information, or viewing version-based historical search results. The network browser supports refinement of timeline searches with different historical version access, and vice versa.

20 Claims, 11 Drawing Sheets

NETWORK BROWSER SUPPORTING HISTORICAL CONTENT VIEWING

CROSS REFERENCES TO RELATED APPLICATIONS

The present application claims priority under 35 U.S.C. 119(e) to U.S. Provisional Application Ser. No. 61/053,260, filed May 15, 2008, and having a common title with the present application, which is incorporated herein by reference in its entirety for all purposes.

BACKGROUND

1. Technical Field

The present invention relates generally to network browser; and, more particularly, to an Internet browser capable of searching historical Internet data.

2. Related Art

In the current information age, millions of web pages containing an amazing variety of topics can be viewed using a network browser over the Internet. Commercially available network browsers can display the HTML (Hyper Text Markup Language) or XML (Extensible Markup Language) web pages on the computer screen where the web pages contain text and images. The network browser usually contains an address bar wherein a user can type in the required HTML/XML web page or URL address, upon which the web page information is displayed on the browser screen of the client device where IP (Internet protocol) is active. The network browser, with the help of one or more Domain Name Servers (DNS), facilitates the accessing of the web page whose address is keyed in the address bar, and the browser displays the contents of the web page. At present, in addition to this display function, the network browser has provision for storing the history of web pages visited, bookmarking certain web pages, and changing display formats in terms of characters and fonts available. However, while the Internet browser can often track sites visited in the past, there is often no ability for browsing and obtaining old/past/historic information pertaining to an older date, time, or versions of content on the Internet. It is possible to access historical web pages by going through cached or archived sites/links one by one, but the content displayed at that address or location will be the current information and not past information that may have been present at that site. Current browsers do not support an easy and efficient way of viewing this kind of historical Internet data.

For example, a user may want to know the news that existed on certain old date or past time of a news web site. Do accomplish this, the user gets the display of that site by keying in the web address obtained from a search. But if the user were to browse the news for the next date or next edition, there is no simple feature available in the network browser to present that content at present. The user has to manually open the next searched link by observing the result and it is cumbersome. Also the user cannot easily navigate through different timelines of historic information for that particular web page.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
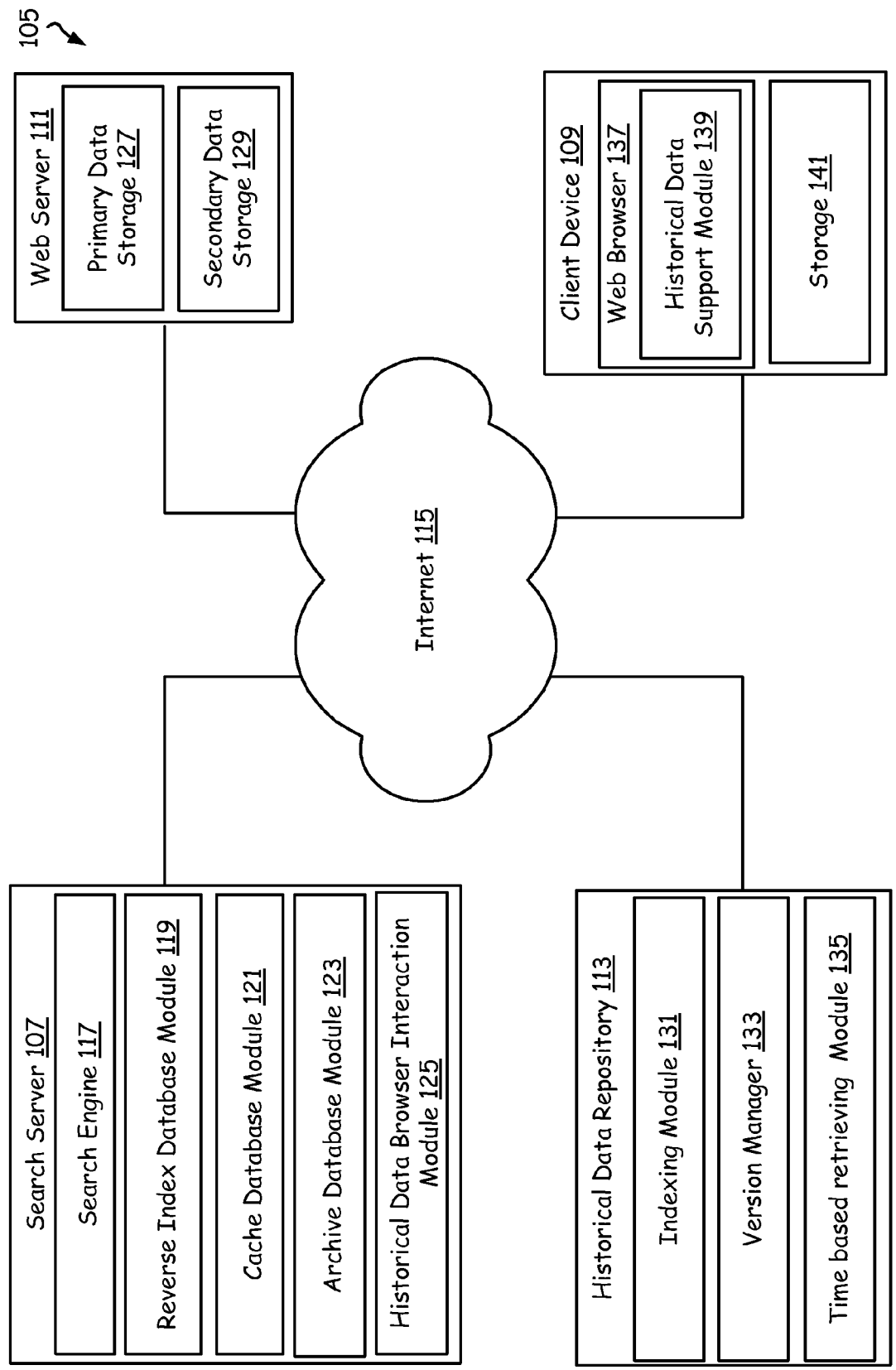
FIG. 1 is a schematic block/step diagram illustrating an Internet infrastructure comprising a search server, web servers, historical data repository, and a client device in which a web browser supports searching of historical Internet data.

FIG. 1 is a schematic block/step diagram 105 illustrating an Internet infrastructure containing a search server 107 and a historical data repository 113. The infrastructure enables search operations for historical Internet data when requested by one or more client devices such as device 109. When a user requests a search, such as a keyword search, with a definite time window or some sort of time and/or date delineation through a client device's interface (such as a web browser 137) the search server searches for the search result(s) and produces the result(s) for user review in the client device web browser 137. The historical data support module 139 of the client device web browser 137 interacts with the historical data browser interaction module 125 of the search server 107 to display certain search results of interest to the user.

A user inputs a search keyword in a search server web page using the web browser 137 of the client device 109. The historical data support module 139 facilitates in the search. The user input search keyword(s) are forwarded to the search server 107 through the historical data support module 139.

Figure 3:
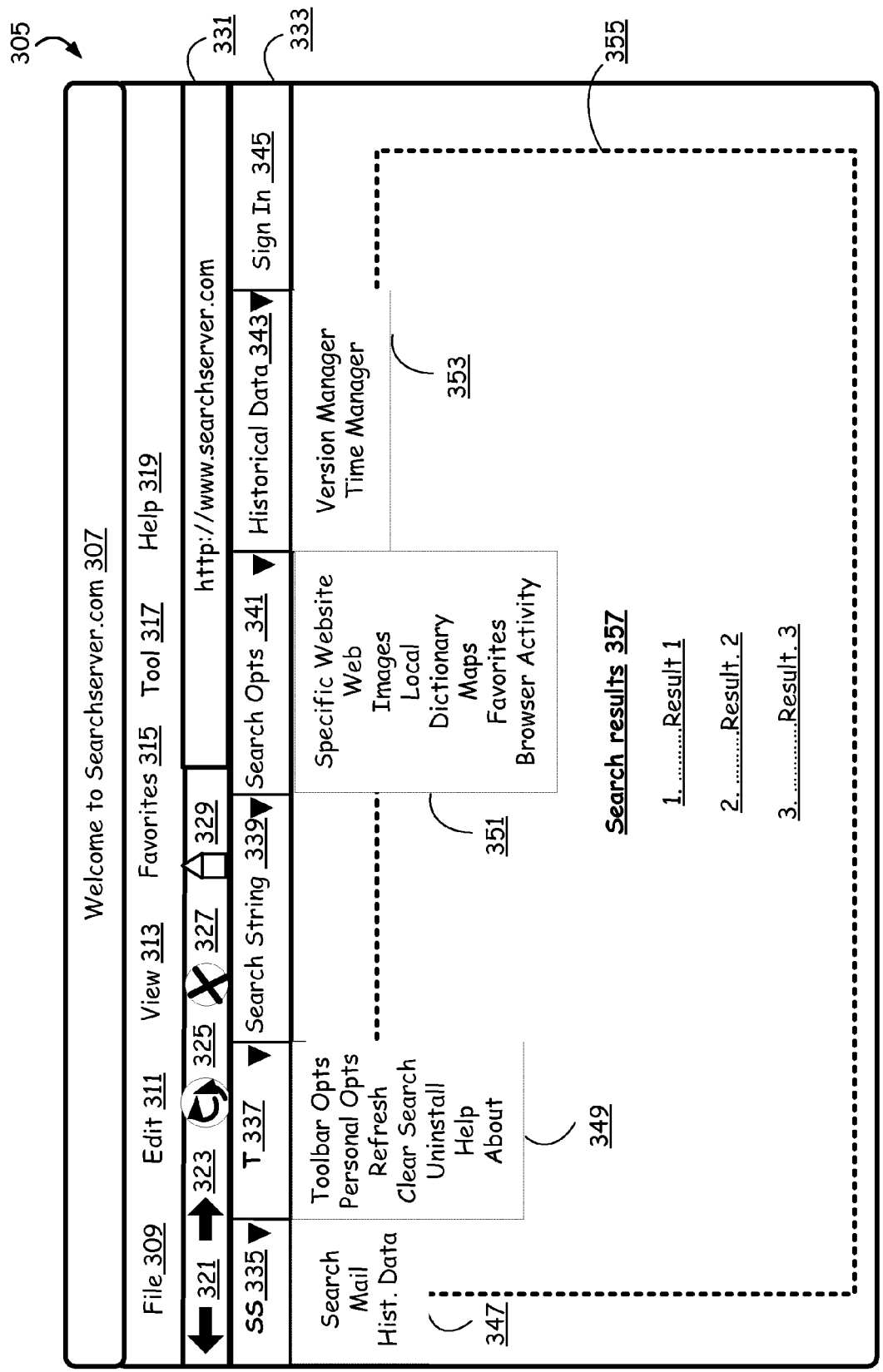
FIG. 3 is a diagram illustrating a client device network browser that has a historical Internet toolbar with various options.

The historical data support module 139 can be integrated into the web browser 137 or be a separate application, ad-in board, software, and/or hardware. FIG. 3 shows how different functions can be performed by the historical data support module shown in FIG. 1. Storage 141 in the client device 109 facilitates the storage of the information searched by the search server 107.

The search server 107 searches the contents in the web servers, such as server 111 that is geographically located anywhere over the Internet or related network. The server 111 is connected to server 107 through the Internet 115. The search server 107 contains server applications such as a search engine 117, a reverse index database module 119, a cache database module 121, an archive database module 123, and a historical data browser interaction module 125. The search server 107 is connected to a plurality of web servers, such as server 111, along with a historical data repository 113. The connection of server 107 to the server 111 and the repository 113 is via the Internet 115. The web server 111 stores various webpage data in the primary data storages 127. The older version(s) of the web page data of the web server 111 is stored in secondary data storage 129. The archive database module can also be located in the web server 111 in addition to or in lieu of the module 123 in server 107. Therefore, the archive database module 123 that stores the archive data of the web server 111 can be located elsewhere.

The search engine 117 of the search server 107 basically performs the search function(s) taught herein with assistance from other components taught herein. The reverse index database module 119 has various web URLs stored and indexed according to certain keywords and/or arranged alphabetically for easy retrieval/use. When a search request is received by the search server 107, the search engine 117 searches the already built reverse index database via module 119 and produces the proper search result if it is already available along with other search criteria. The cache database module 121 caches the data of recent search results (web contents) such as key word searches, so that the search server does not need to fetch the data from the respective web servers in all cases. This cached data remains in the cache until a new search on the same keyword is performed and results in different web contents as search results. The cache results from the cache database eventually gets shifted to the archive database of archive database module 123 once a new search gets performed that results in replacement of this information in the cache memory space. Only the recent results are stored in the cache, and remaining data that is removed from the cache is shifted to the archive database associated with module 123. Historical data is retrieved from the historical data repository 113 by using the search server during a search operation.

The historical data browser interaction module 125 interacts with the client device web browser 137 to output the user requested search results that are historically stored. A user inputs search keywords along with search criteria, such as criteria indicating to do a search using browser activity, or a search within a geographical region, etc. If historical data is requested, the system uses the historical data support module 139 in the web browser 137 of the client device 109. When a user requests access to historical/past Internet data using the historical data support module 139 (which could be a toolbar in the browser in one exemplary embodiment), then the historical browser interaction module 125 of search server 107 deciphers the search request and allow further processing of search action.

The historical data repository 113 stores data in an organized manner. It stores the historical data according to date and/or time and also stores data according to different version identification for later retrieval/use. The historical data repository has an indexing module 131, a version module 133, and a time based retrieving module 135. The indexing module 131 stores the historical data in a database for easy retrieval. The version module 133 stores the data in different versions for easy versioned data retrieval. The time based retrieving module stores the data according to different date and time stamps. Once given the user preferences, the search engine searches the web pages for a given keyword over the Internet. When the user preference is to obtain search results from a historical date, the search result data is retrieved from the historical data repository 113 by the search engine 107 and is delivered to the client device 109.

According to the embodiments taught herein, the web browser supports the historical data browsing/searching. A user can browse the data from an older date/time by keying in the search word for this content and clicking on the link that is output by the search server. The historical data support module 139 in the web browser interacts with the historical data browser interaction module 125 to get the historical search result. The historical data support module that the user uses can be in the form of a toolbar embedded in the browser and shown in FIG. 3. Through various icons in the web browser, the historical data is searched by the server and displayed on the web browser. The browser supports the user stepping through time for the searched web pages. Meaning, a user can step through the web pages at various times of a day or over various dates, a process which is discussed in more detail via FIG. 4A. The browser also supports stepping through various versions of a web page to review historical data as illustrated in FIG. 4B. The browser supports stepping through versions and timeline interchangeably as historical web data is accessed in a search operation.

In one example/embodiment, a user is trying to search for information about the timeline of news events that lead to an important event or outline a certain progression of events. The user keys in one or more appropriate search word(s) in the search server web page using the web browser of the client device. The user can step through all the news events on that web page per a timeline or version tracking, as specified. The browser supports scanning web contents historically through time by stepping through different days of the news page and also different versions of the web page in a given day, as archived in the repository 113 or other storage.

In another example, a user wants to know the stock price of a particular company. So, the user searches for the company web page or stock reporting pages and goes back to or through historical dates that the user wishes to analyze for stock price changes. The user can step through each day about the happenings of the company and the variation in the stock price using the web browser, and see the historical information as it unfolded over time. The user can get various historical analyses on the browser window for his reference for future review, investments, etc.

Figure 2:
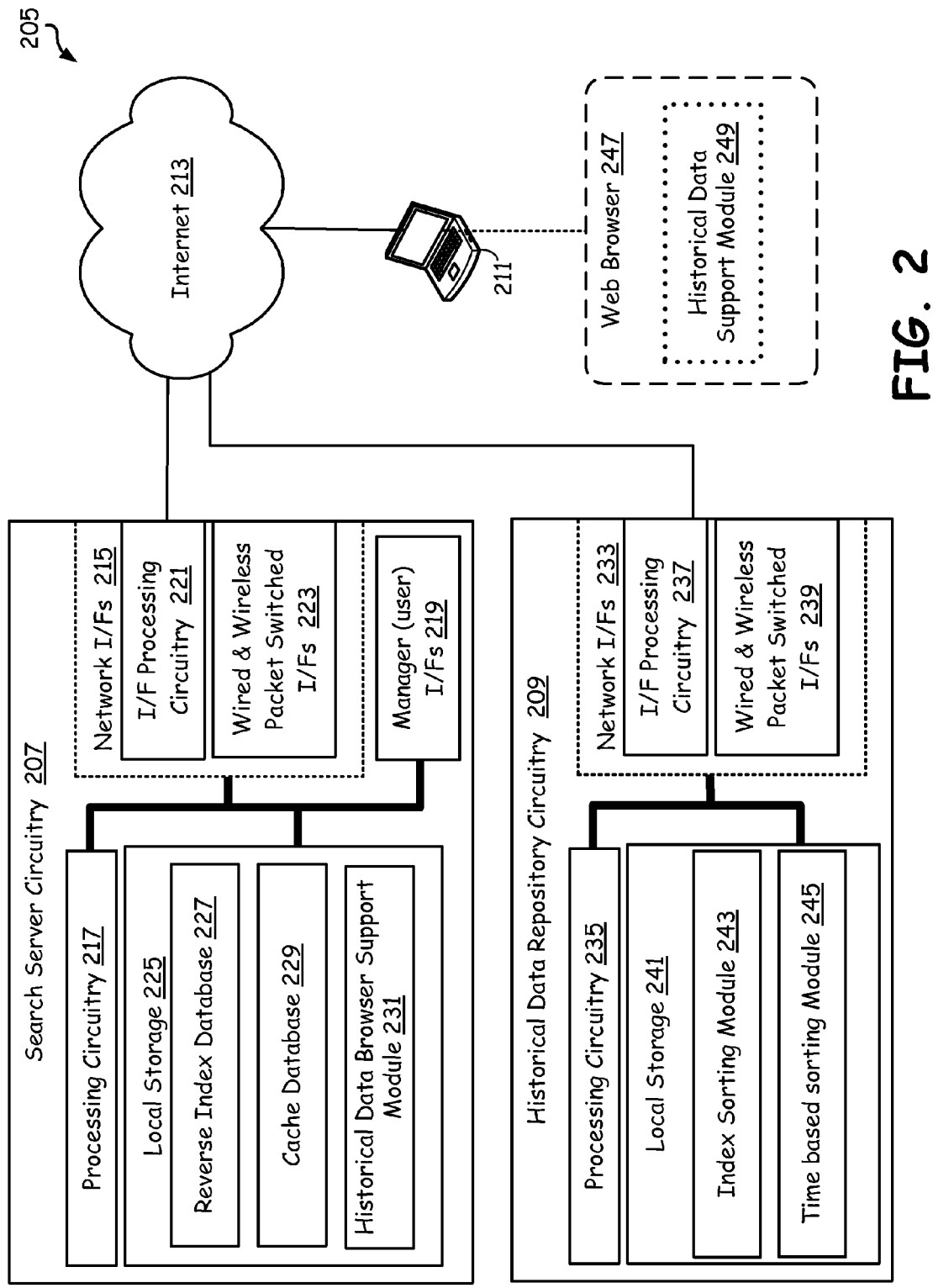
FIG. 2 is a schematic diagram illustrating components of the search server, which includes a historical data repository, and shows their interaction with a client device shown in FIG. 1.

FIG. 2 is a schematic diagram 205 that illustrates components of the search server and the historical data repository of FIG. 1 and their interaction with a client device that is also shown in FIG. 1. In FIG. 2 the search server circuitry 207 is connected to the historical data repository circuitry 209 and the client device 211 through the Internet 213 (or another private, wireless, wireline, optical, or other network other than the Internet). The search server circuitry 207 generally includes processing circuitry/CPUs 217, local storage 225, a network interface 215, and a user (admin) interface 219. These components are communicatively coupled to one another via one or more of a system bus, dedicated communication pathways, control signals, and/or other direct or indirect communication pathways. The network interface 215 has interface processing circuitry 221 and wired/wireless packet switched interfaces 223. The interface 215 can be hard wired to interoperate with the processing circuitry 207 for faster communication and/or search operation. The manager (admin/user) interface 219 facilitates IT or user control of the search circuitry operations. Local storage 225 may be any type or combination of random access memory (RAM), read-only memory (ROM), non-volatile memory, flash memory, a disk drive, an optical drive, and/or another type of memory that is operable to store computer instructions and/or data. The local storage 225 contains primarily the reverse index database 227, a cache database 229, and a historical data browser support module 231. The reverse index database 227 stores the addresses of the URLs in a reverse index format. The cache database stores the data of certain recently-crawled webpage contents hierarchically-accessed down through a desired level of sub-URLs/links. The historical data browser interaction module 231 interacts with the historical data support module 249 of the client device to produce search results. For example, the circuitry 207 can collect the search criteria, such as search from current geographical region, search from the frequently visited web sites, and search from favorites of web browser, and use that search criteria to perform current or historical search operations.

The historical data repository circuitry 209 contains processing circuitry/CPU(s) 235 and local storage 241. The circuitry 209 is connected to the search server circuitry 207 and the client device 211 through the Internet 213 using the network interfaces 233. The network interfaces 233 contain wired and/or wireless packet switched interfaces 239. The network interfaces 233 may also contain built-in or an independent interface processing circuitry/CPUs 237.

The processing circuitry 235 receives information from the Internet through the network interfaces 233 and processes the information for use in the historical data repository circuitry 209. This circuitry can be implemented through custom hardware or CPUs for faster operation or can be software-driven or a combination of software and hardware. The local storage 241 has an index-sorting module 243 and a time-based sorting module 245. The index-based sorting module 243 stores historical web contents as per the reverse index database for later retrieval. The time-based sorting module stores the crawled web data according to date and time. The web pages contents for different dates, times and versions are stored in the local storage as historical data. This stored data is delivered to the web browser 247 of client device 211 through Internet 213 when a historical search result is to be delivered upon a user request. The client device 211 has a network browser 247 through which a user performs historical data search operations and/or normal search operations. The web browser with the historical data support module 249 facilitates a user to search historical data. The details of this historical data support module are discussed with respect to FIG. 3.

In one example, a user who wants to search for the web documented history of an individual as they existed in a given duration of time may search for this historical information in the client device web browser by keying in an appropriate search string. The user, with the help of historical data support module, sends the request to search server. The search server circuitry first searches for the available URLs from the reverse index database. Since an old data request is made and this data is not available in the local storage of search engine, a request is made to the historical data repository circuitry to satisfy the search with appropriate search results. The historical data repository, based on the indexing module and the time based sorting module, retrieves the data, and send the data to the client device web browser via the search server or under control of the search server.

FIG. 3 is a diagram 305 illustrating the client device network browser display screen or interface having a historical Internet toolbar with various options that facilitates a search operation. When a user opens the web page of a search server or begins a search/browser operation, a welcome message "Welcome to searchserver.com" 307 appears on the top of the web browser 333 of the client device as shown in FIG. 3. The web browser has the menu items File 309, Edit 311, View 313, Favorites 315, Tool 317, and/or Help 319 as well as other optional menu items. The File menu 309 has sub menus (not shown in FIG. 3) for opening, closing, saving file, printing and exiting files, like any standard network browser. The Edit menu 311 has editing options such as cutting, pasting, copying, deleting, and searching a string in the page, like any standard web browser. The View menu 313 has viewing options such as view page source, enlarging options (text style, text size), viewing different page styles, and character encodings. The Favorite menu 315 has options for organizing user favorite web pages such as adding to existing favorites, book marking important ones, and displaying recent favorites (number depending on the user). The Tools menu 317 can store the recent browsing history, organize downloads, block/step the downloads containing viruses, popup ads, network browser setups such as the proxy, security, language, security, and organizing passwords for important websites visited by the user. The Help menu 319 provides sub-menus for browser help, release notes, customer feed back etc. Below this menu bar, there is a graphical toolbar for the browser for easy search operation control. This graphical toolbar contains a left and right arrow 321 and 323 for browsing forward or backward in the search results or history, a circular arrow 325 for reloading the current webpage, a cross mark 327 for stop a loading of the current web page, a home symbol 329 for loading the home page set by the user or client, and an address bar where the user can key in the address of the webpage to be opened/browsed. In the present example, "http://www.searchserver.com" is shown in the address bar depicting the user's intention to open the search server web page.

The toolbar 333 is embedded in the web browser 331 and facilitates in the historical data search operation according to embodiments taught herein. How the toolbar is obtained and installed on the current web browser to function it as historical data web browser is discussed in FIG. 6. In this historical Internet data network browser, various icons for searching and storing are present. In FIG. 3, several icons are shown, such as search server icon SS 335, toolbar icon 337, search string text box 339, search options menu 341, historical data menu 343, and user sign-in 345. The search server icon SS 335 has a pull down menu 347 for selection such as search, mail, and historical data. The first option of "search" performs a regular search operation. The second option of "mail" is for utilizing mail service with the search server, and the last option "historical data" is for searching historical data as taught herein. For searching historical data, a user chooses the option "historical data" from the search server icon SS pull down menu 335. The toolbar icon T 337 has pull down options 349 that are listed as toolbar options, personal options, refresh, clear search, uninstall, help and about The toolbar option is used to enable certain user preferences such as using anti-spam while browsing web pages, enable search history, enable search from popular web pages, etc. The personal option is used to personalize the ordering and options for the historical Internet toolbar icons as per user desires/interests. The refresh option refreshes the current search. The clear search option clears all the search results from the network browser display and from the local cache. The uninstall option uninstalls the historical Internet toolbar that is installed in any network browser for the historical Internet data search. The help menu provides the user with help on using the current toolbar, and the about option provides the details of the toolbar, such as the software version and the major functions that it can perform.

A user keys in the desired search string(s) in the search string options box 339 for search purposes. In the search options 341 there is a pull down menu 351. In pull down menu 351, a user can provide various options of search for a given one or more search strings. The option "search specific web site" requests that the search server search in a specific website only. The option "web" provides a search over the whole Internet. The options images, local directory, and maps provide a request to the search server to search only in the images, local directories, or different maps respectively. The option to search from the favorites provides a request to search server to search for search results only based on the favorites of the user. Another option "search using browser activity" searches for search results from the recent browser activities. Sometimes, the user does not keep track of all the web pages they have visited where the user has found certain useful information, but the web browser can store this information in recent cache. The option "search from the browser activity" provides information to the search server to search from those cached web pages only.

The user searches the historical data by specifically selecting the historical data 343 pull down menu 353 on the toolbar of FIG. 3. Typically menu item 343 has two important submenus, and they are: version manager, and time manager. The details of these submenus are described in FIGS. 4A, 4B, and 5 herein. The version manager allows the user to search various historical versions of a given web page or location, and the time manager facilitates a user's searching in different timelines (or time/date stamps) of any available web page in any time sequenced manner. The last option of the historical Internet tool bar 333 is a sign-in selection 345 allows a user to sign into the historical Internet data search service. When a user uses the search service for the first time, the search server requests that the user register a user name and provide other registration details such as one or more of name, address, mode of payment for the service, credit card info, email address, etc. The registration details and access to the search service are discussed with respect to FIG. 7. The search results 357 that are found per the user-given criteria and search string(s) are displayed in the window 355 of FIG. 3. The search results provide links for browsing respective web pages. And, the interface to the search results can provide some additional features such as allowing for refining of searches for different versions of historical and different historical timelines, which are taught in more detail with reference to FIGS. 4B, 5, 7, 8, and 9.

In one example, a user desires to browse the BBC news on a particular day ten years back. The user first signs into the search server using the sign-in selection 345 of the historical Internet toolbar 333 of FIG. 3. The user then specifies the search string "bbc news" and uses the timeline manager of the historical data pull down menu 353 to select the specific date for which the news is sought. The network browser, with the help of the historical Internet toolbar, provides the search results on the browser screen 355. When the user tries to get further information or begin a search, depending on the importance and rarity of the data, the search server charges the user. This billing information is sent to the user through email to his registered account or is processed via on-line and automated credit card or electronic cash processing.

Figure 4A:
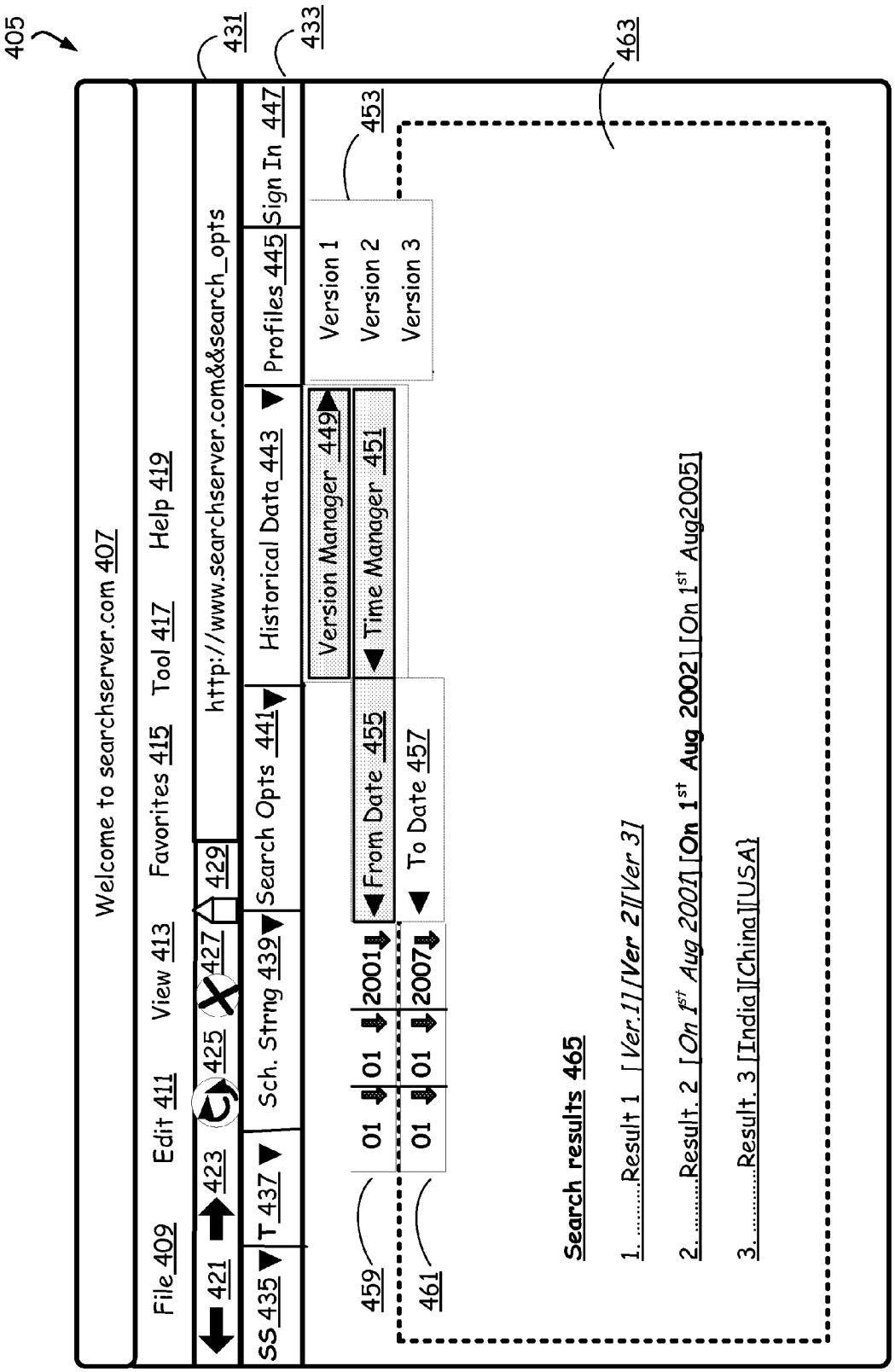
FIG. 4A is a diagram of a client device network browser that has options for performing historical Internet data searches using the historical Internet data toolbar.
Figure 4B:
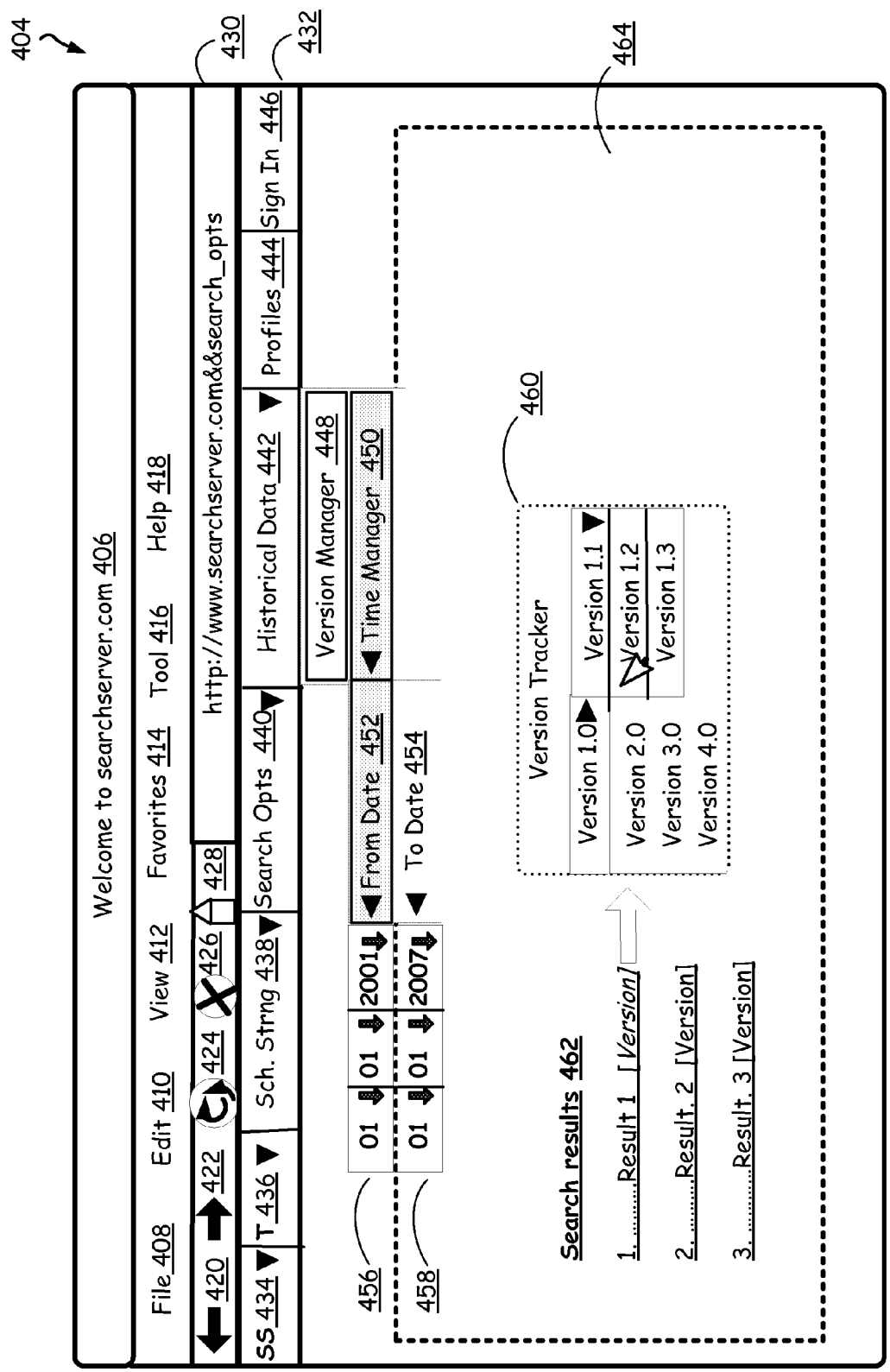
FIG. 4B is a diagram of the client device network browser that has options for performing historical Internet data searches using different timeline data and/or different versions data/indicators.

FIG. 4A is a schematic diagram 405 of the client device network browser. FIG. 4 illustrates options for performing a historical Internet data search using the historical Internet data toolbar 433. The welcome message for searchserver.com 407 is shown at the top of the web page 431. The network browser has menus for File 409, Edit 411, View 413, Favorites 415, Tool 417, and Help 419 as described for corresponding menus 309, 311, 313, 315, 317 and 319 respectively per FIG. 3. Also, there is a graphical toolbar 431 with forward and backward arrows 421 and 423, circular arrow for reload 425, a cross for stop 427, a home symbol 429 for home page loading, and an address bar for keying in the required URL to access a search server. The network browser also has the historical Internet toolbar with various icons and options such as SS icon 435, toolbar icon 437, search string menu 439, search options 441, historical data 443, and sign in 447 with similar functions of 335, 337, 339, 341, 343 and 345 respectively, as previously described for FIG. 3. FIG. 4 also shows an option for creating and using user profiles 445 to keep track of user preferences of the network browser.

The historical data option 443 has a pull down menu to allow a user to select version manager 443 and/or time manager 451. A user keys in the search server web page address in the address bar location and opens the search server web page. The user can choose a desired user profile 445 in the local client device network browser and log onto the search server using the sign-in selection 447. The user can now access the historical Internet data search using the historical data pull down menu(s). After providing the search string(s) 439 and the search options 441, the user gets the search result back from the search server via the browser screen window 463. The search results 465 are displayed in the search window area 463. From the historical data pull down option 443, the user can cycle back and forth through various versions and timelines of any given search result item. The cycling through of different versions is controlled by version manager 449, and this allows a user to start searching search results at a specific version or a specific date/time entry and them move sequentially via version or time through the earlier and later entries for that web location/page. Depending on the versions available, the network browser permits the user to cycle through the required version from the pull down option box 453 of FIG. 4A. Different timeline information is controlled by the time manager option 451 of FIG. 4A. By clicking on option 451, the user can choose the from-date and to-date between which he wishes to search a given web page historical information. The from-date option 455 can be set by choosing the corresponding pull down menu for selecting the day, month, and/or year 459. Similarly, the to-date is set by choosing the corresponding pull down menu and selecting day, month, and/or year 461. The network browser supports outputting the results in different formats or versions. For example, in FIG. 4A, the result 1 has been displayed with a version 1 selection. But to switch to other versions (version 2 or version 3) various links have been provided to select other versions. By clicking on those version 2 or version 3, respective version data is output on the network browser screen. According to one embodiment, the switching of results from different versions to a different timeline or a different timeline to different versions is supported by the network browser. These operations are discussed with respect to FIGS. 4B, 5, 6, and 7.

In one example, a user who wants to search BBC news on a particular historical date (say for example ten years old) may key in the keyword(s) for particular event in search string 439 and enter a date or data range on which the user wishes to find the news information. The time or time range input is done using the time manager 451. The search server outputs the search results correlating to the time information and the search string(s) on the network browser with different versions such as British edition, Asian edition or US edition which the user can switch through.

FIG. 4B is a diagram 404 showing the client device network browser 432. FIG. 4B illustrates options for historical Internet data searching using different timeline data to different versions. A welcome message "Welcome to Searchserver.com" 406 is displayed on the top of the network browser 432. The network browser has options with pull down menus for File 408, Edit 410, View 412, Favorites 414, Tool 416 and Help 418 with similar functions as functions 409, 411, 413, 415, 417, 419 respectively described in FIG. 4A. The graphical tool bar with left and right arrows 420 and 422, circular arrow 424, cross 426 and home symbol 428 are present in the network browser with same functions as functions 421, 423, 425, 427, 429 as respectively described in FIG. 4A. The historical Internet data toolbar with menus for search string icon 434, toolbar icon 436, search string box 438, search options menu 440, historical data menu 442, profiles 444 and sign-in option 446 are present in the web browser with similar functions as functions 435, 437, 439, 441, 443 and 445 respectively from FIG. 4A.

A user interested in searching any form historical data will first sign into the search server by selecting a user profile 444 from the browser and choosing sign-in option 446. Then the user provides the search string(s) 438 with search options 440 to enable searching. The user further refines the search by selecting the historical data pull down menu 442 from where the user can choose version manager 448 or time manager 450. In the current figure, the user selects the time manager 450 as shown. The user further selects the timeline information by choosing the from-date 452 and to-date 454 and selecting appropriate day, month, and year from the pull down menus 456 and 458. Upon receiving these options and a request for search, the search server produces the result and outputs the search results to client device. The client device network browser displays the search result 462 in a search result box 464, as shown in FIG. 4B. The historical search results displayed are for a particular timeline that user has selected. In FIG. 4B, the network browser also provides options in the search results to browser through different versions of the searched historical web pages. In FIG. 4B, upon clicking on the result 1 version information, a version tracker 460 pops up. This version tracker has web links for major and minor revisions of the search result web page that is presented as a search result. The user can first browse through major historical revisions such as version 1.0, version 2.0 etc. by using a pull down menu from each major revision box, and the user can browse through the minor historical revisions such as version 1.1, version 1.2 etc. for version 1. In essence, the network browser supports browsing of historical data for a given timeline with refinement for major and minor revisions of the web pages.

In one example, a user may want to search for particular freeware software that is an older version of the software. The user desires this older version as this older version is compatible with an older operating system the user is interested in. The user may search for the older software in the client device web browser by keying in the search word for the software with the desired timeline information. The search results of the search server are displayed on the client device network browser screen. The user can then further refine the search to zoom in on the version of the software he wants by clicking on the version information that is supported by the browser. By working through the historical information, the user can get the particular version of the old software that is desired.

Figure 5:
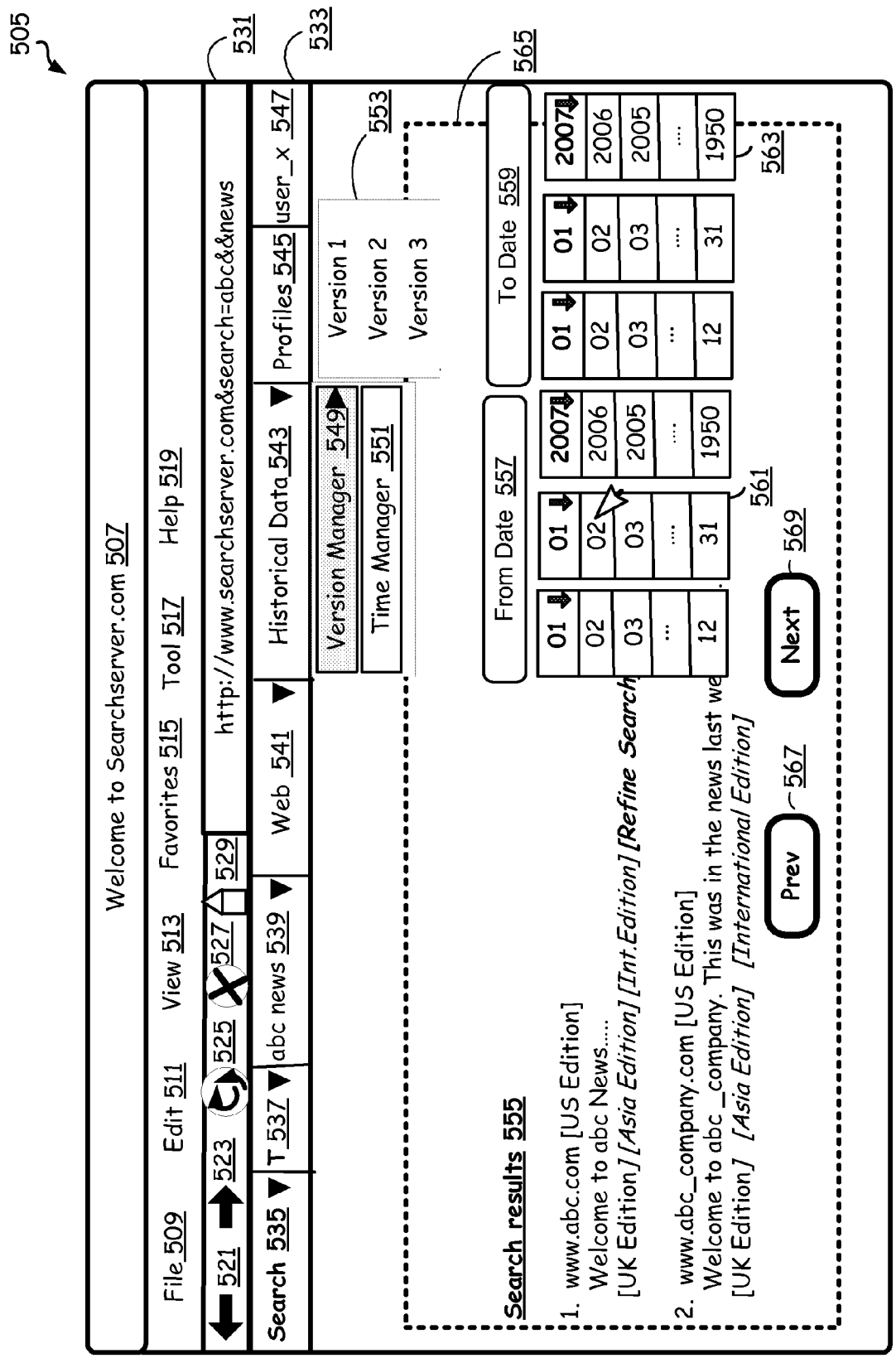
FIG. 5 is a diagram of a client device network browser showing popup window(s) for timeline searching for different versions of historical Internet content.

FIG. 5 is an exemplary diagram 505 of the client device network browser. FIG. 5 shows a popup window for timeline searching for different versions of search results. The network browser has menus for file 509, edit 511, view 513, favorites 515, tool 517 and help 519 with the functions of functions 409, 411, 413, 415, 417 and 419 as described in FIG. 4A. The graphical tool bar with icons of left and right arrows 521 and 523, a circular arrow 525, a cross 527 and a home symbol 529 are present in the network browser with same function as functions 421, 423, 425, 427, and 429 respectively described via FIG. 4A.

A screen shot of the network browser window where the user wishes to find information about "abc news" is shown in FIG. 5. The historical Internet data toolbar with menus for search option 535, toolbar icon 537, search string box with the strings abc and news 539, search options menu with web being highlighted 541, historical data menu 543, profiles 545 and user_x in sign-in selection 547 are displayed in the web browser. The version manager 549 option shows different versions 553 of a historical web page as available for display on the browser. The time manager 551 is not specifically shown or used in the current example.

Upon receiving the search criteria and request from the client device, the search server searches for the available historical web pages and delivers the historical search result to client device. The client device outputs the search result(s) 555 on the network browser results window 565. Two search results are shown in the example of FIG. 5. The first one is "www.abc.com" which provides abc news service web page with a brief description about the web page. This search result has options for different news edition, UK edition, US edition, International edition. The second result shows "abc_company.com" with a brief description and different versions of this web page. There is an option with buttons previous 567 and next 569 for browsing through the previous and next set of search results.

The first search result in window 555 has another option for refinement. By clicking upon this window, the browser pops up menus for obtaining various timeline data for the selected web page (www.abc.com, in the present case). The from date option 557 and to date option 559 has pull down menus 561 and 563 for selecting the from-date and to-dates respectively. The network browser facilitates the user to choose the day, month, and year for the from-date and to-date to refine the search results as desired by the user. According to FIG. 5, the network browser allows the user to refine the search results by allowing the user to peruse different versions and then convert to a different timeline approach.

In one example, a user that wants to know about a particular product keys in the search string. The browser then displays the search results by providing links to a required product catalogue with different editions such as UK, US and Asia. The user chooses the desired edition and chooses to refine the search further for information during a specific period of time/date. The user utilizes the refine search option/capability of the browser to refine the results and uses the pull down menu to provide the timeline data. With the timeline data, the user gets the required historic information about the product such as the price, the features available at that time, etc., for analysis.

Figure 6:
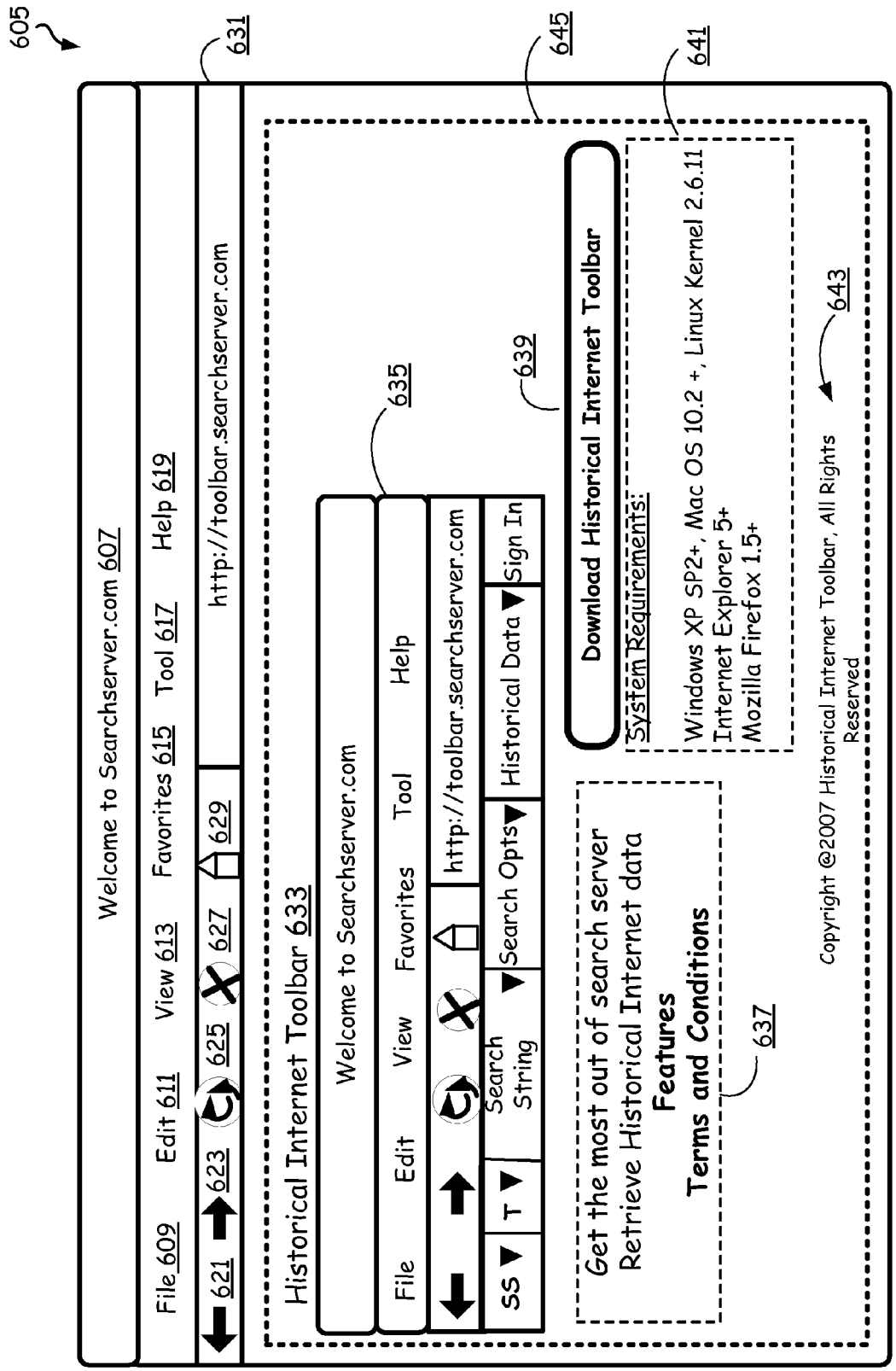
FIG. 6 is a diagram illustrating a screen shot for downloading and installing a historical Internet data toolbar.

FIG. 6 is a schematic diagram 605 that illustrates the screen shot of a typical search server web page. The server web page is used for downloading and installing a historical Internet data toolbar. The toolbar can be used along with the historical Internet data browser interaction module to search and browse historical Internet data, web pages, locations, content, etc. FIG. 6 shows a network browser 631 with a search server web page opened by a user. The welcome message "welcome to searchserver.com" 607 is displayed on the top of the web page and the copyright statement 643 is displayed at the bottom of the web page. The regular network browser menus for File 609, Edit 611, View 613, Favorites 615, Tool 617, and Help 619 with corresponding pull down menus (not shown in FIG. 6) are located below the welcome message. Also the graphical toolbar with left and right arrow 621 and 623, circular arrow 625, cross symbol 627, and home symbol 629 are present below. These icon options 621-629 facilitates easy browsing as described in previous figures. The user opens the web page "http://toolbar.searchserver.com" by keying in this address in the address bar. The box 645 displays the content of the historical Internet data toolbar information. At the top of the message box 645, Historical Internet Toolbar 633 is displayed with bold characters. Below that a snap shot of the historical Internet toolbar 635 is displayed. This screen snap shot shows various icons that the toolbar contains, and how the toolbar is integrated with the network browser in one embodiment. The toolbar with the icons such as SS for search server icon with pull down menu, T for toolbar set up, search string input text box, search option pull down menu, historical data icon with pull down menu, and a sign in text box for user to sign onto the search server are shown in FIG. 6. Below this sample toolbar, there is a text box 637 which shows a description of these toolbar options. This description shows the message, "get most out of the search server," and "retrieve historical Internet data." The link to features of the historical Internet data toolbar can be obtained by clicking on the highlighted word Features. Below that, the link to terms and conditions for using this toolbar highlighted. The terms and conditions depend on the search service provider, who may for example specify that certain legal terms are to be accepted for searching restricted web sites or historical data. Next to the text box 637, the button "Download historical Internet toolbar" 639 is present. A user can download the toolbar and auto install it by clicking on this button. The system requirements for this toolbar are specified in a text box 641 where the requirements for the operating system and normal network browsers are mentioned. In one embodiment, minimum requirement to install this toolbar may be Windows XP operating system with service pack 2 (SP2), or Linux system with kernel 2.6.11 or above. The minimum hardware requirement could be 256 MB memory space with 512 MB RAM. All these requirements are presented to the user. Also various popular web browsers in which the toolbar could be integrated or installed could be Internet Explorer or Mozilla Firefox. All these hardware and software requirements are specified in the text box 641. A user, upon visiting the web site and noting down these minimum requirements that his client device should meet, could download and install this toolbar that can be easily integrated with the web browser. This toolbar facilitates easy search of historical Internet data as discussed in the previous figures.

Figure 7:
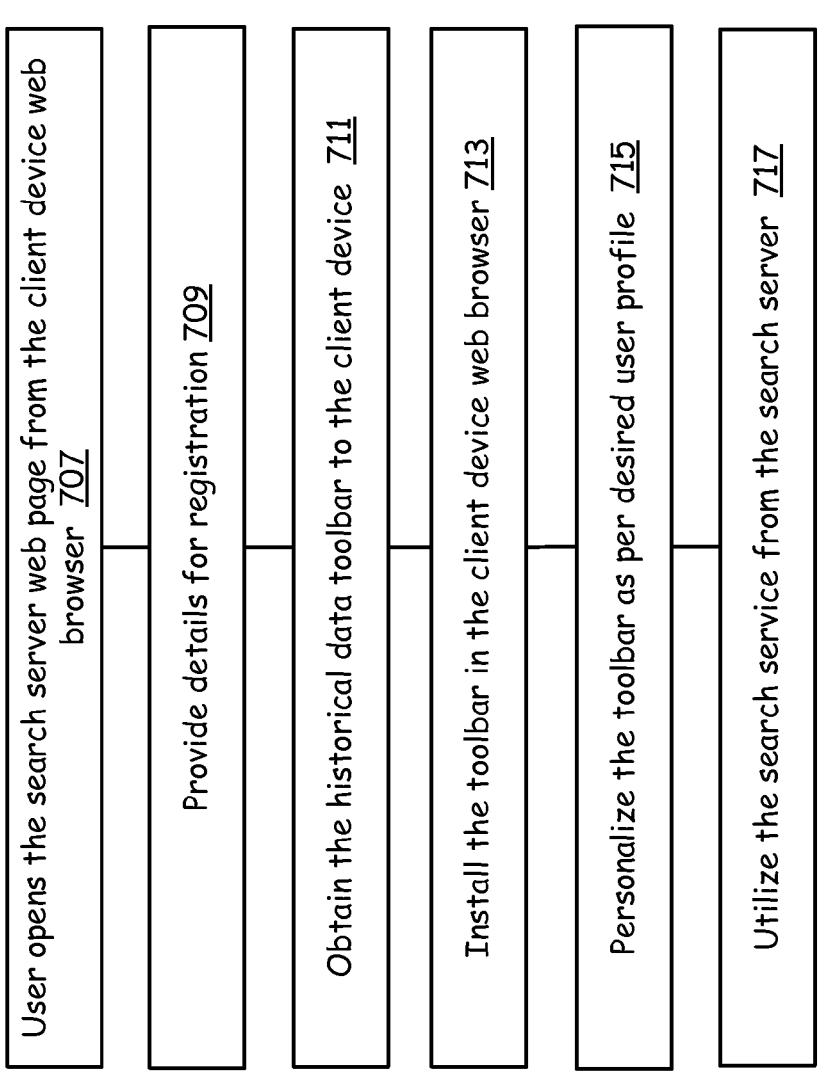
FIG. 7 is a method flow diagram illustrating how a user of the client device may utilize the search service of a network browser.

FIG. 7 is a method flow diagram 705 illustrating how a user of the client device utilizes the search service via the network browser. From the client device web browser, the user opens the search server web page at a block/step 707. The user keys in the search server address, such as http://www.searchserver.com, in the address bar of the network browser. At a next block/step 709, the user provides the details needed to register for downloading the historical Internet data toolbar. The registration details include name, address, desired login name and password, method of payment for utilizing search service, provides the credit card details in case of payment by credit card, among other possible information. Upon registration and validation of the non-existence of a similar user name by the search server, the user downloads the historical Internet data toolbar into the local client device at a next block/step 711. The user then installs the toolbar manually or it auto-installs upon download wherein the search server automatically installs and integrates the historical Internet toolbar with desired standard network browsers present in the client device at a next block/step 713. At a next block/step 715, the user can personalize the toolbar according to his individual tastes, needs, and choices. The user can retain, add, or delete the display of certain icons and interfaces, can set default language preference, set default region preference, and can store the login name and password so that, upon opening the search server web page, the user automatically logs onto the search server. At a later block/step 717, the user utilizes the historical search service from the server by using this personalized toolbar. Using the historical toolbar features, the user can search historical Internet data, step through different versions of the historical data, step through different timelines of data, switch between different versions and different timelines for specific data, and vice versa. Depending on the complexity if the search, the user pays for utilizing search service.

Figure 8:
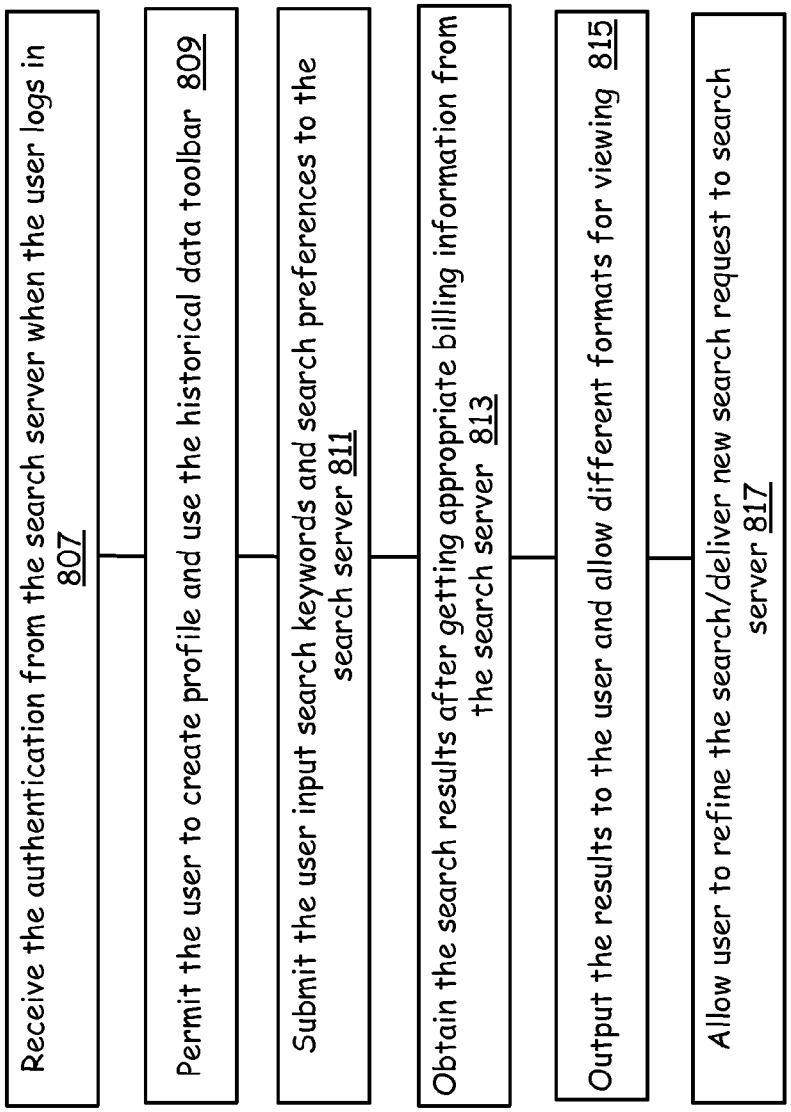
FIG. 8 is a flow diagram illustrating various steps that a network browser undergoes during a historical Internet data search.

FIG. 8 is a flow diagram 805 illustrating various steps that a network browser undergoes during a historical Internet data search process. The network receives authentication from the search server when a user logs onto the server to get the search service at a block/step 807. In one embodiment, only after authenticating the user log in, the various icons of the historical Internet data toolbar that is embedded in the network browser of the client device becomes active. The network browser at a next block/step 809 allows the user to create a profile and allows access to all the icons of the historical Internet toolbar. The user can however select, delete, add, and deselect certain icons of the available icons; rearrange the appearance of the icons as per his preferences. At a next block/step 811, the network browser, with the help of the historical data browser interaction module (such as toolbar here), submits the search request(s) with the search strings (or key words) and the user preferences. The user preferences could inform the system to search from a particular web page, search from a given region, search using browser activities, search from the browser favorites etc. as described in previous figures. At a next block/step 813, the search results are obtained after getting appropriate billing information from the search server. The search server might provide certain billing information that a particular web page data is archived and is rare, or certain important data is available. So, to get certain information, the user may needs to pay out more dollars either through a mail billing system, on-line billing, Pay Pal, etc. If the user is ready for the data and accepts the payment terms (depending on his need and if any payment terms are required), the search result are obtained from the search server after paying the required billing amount (if any). At a next block/step 815, the browser outputs the result and displays the results on the screen for different formats of viewing. The user can switch to different versions of data from different timelines of stored data or vice versa. At a next block/step 817, the browser, with the help of historical Internet data toolbar, permits the user to refine search results and send new search request to the search server for the next search.

Figure 9:
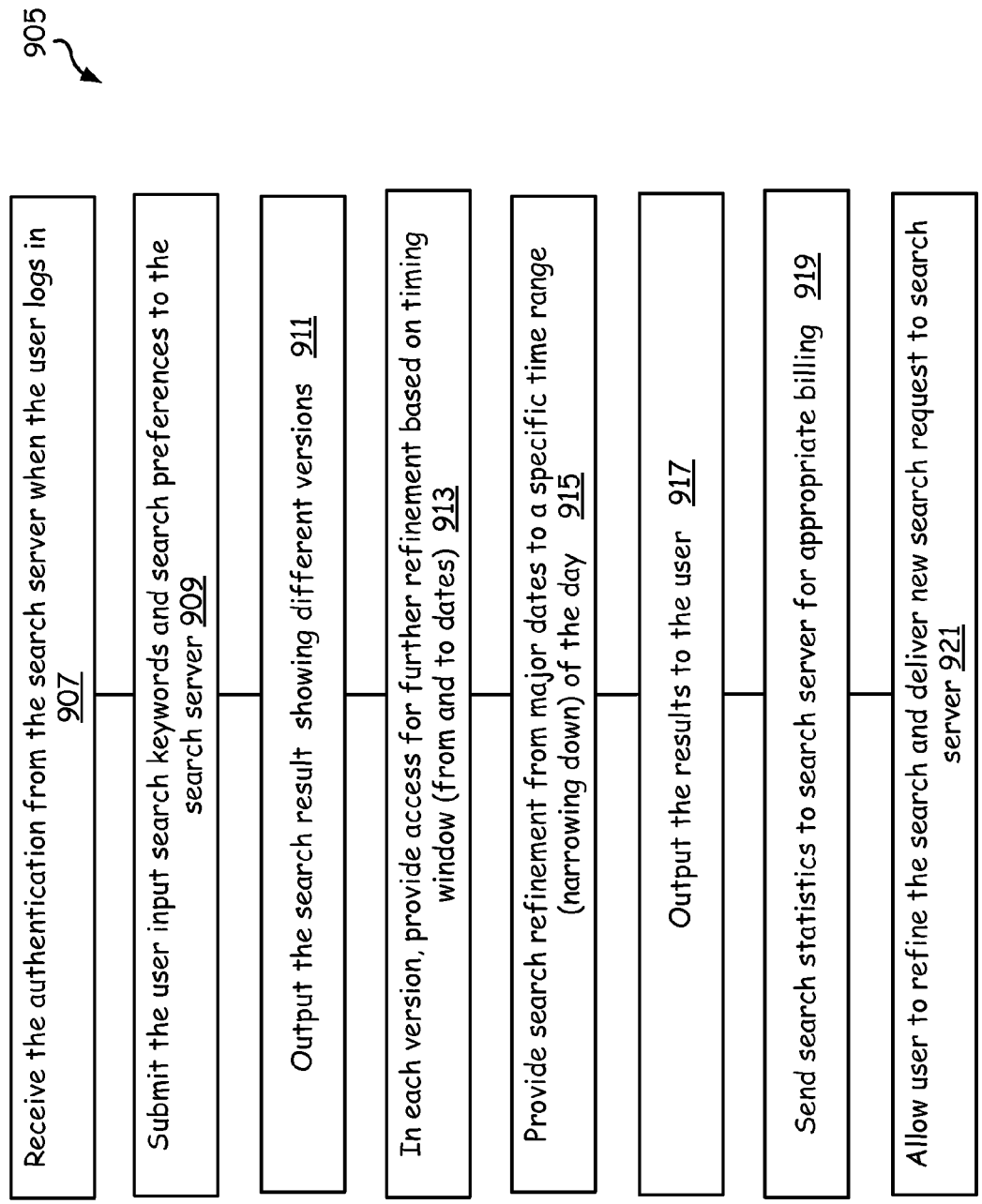
FIG. 9 is a method flow diagram illustrating various steps that a network browser uses to search different versions of historical Internet data and/or different timelines of those versions.

FIG. 9 is a method flow diagram 905 illustrating various steps that the network browser performs to search from different versions of historical Internet data to different timelines of those versions. The network browser receives authentication form the search server upon user log in at a block/step 907. At a next block/step 909, the browser submits the user input search string(s) (or key words/phrases) along with the search criteria to the search server. The search criteria are as discussed in the previous FIG. 8. The browser, with the help of the historical Internet toolbar at a block/step 911, outputs various versions of the search results. For each versions of the result obtained, the network browser further provides for refinement of the search using a timing window where the user can specify a from-date and a to-date at a next block/step 913. The search results obtained at the block/step 911 are further refined to different timeline information at the block/step 913. At a next block/step 915, the network browser window allows the user to further refine the search to a specific time range of a chosen day/time, for example 12:00 noon on 21 Oct. 1970. With these major and minor timing/date refinements, at a next block/step 917, the search results are output on the network browser window. The search options and statistics of the searches conducted are monitored by the network browser and appropriate billing is obtained from the search server at a next block/step 919. The browser facilitates stepping through the search results through different timelines and once the results are delivered sends new search request to the search server at a next block/step 921.

Figure 10:
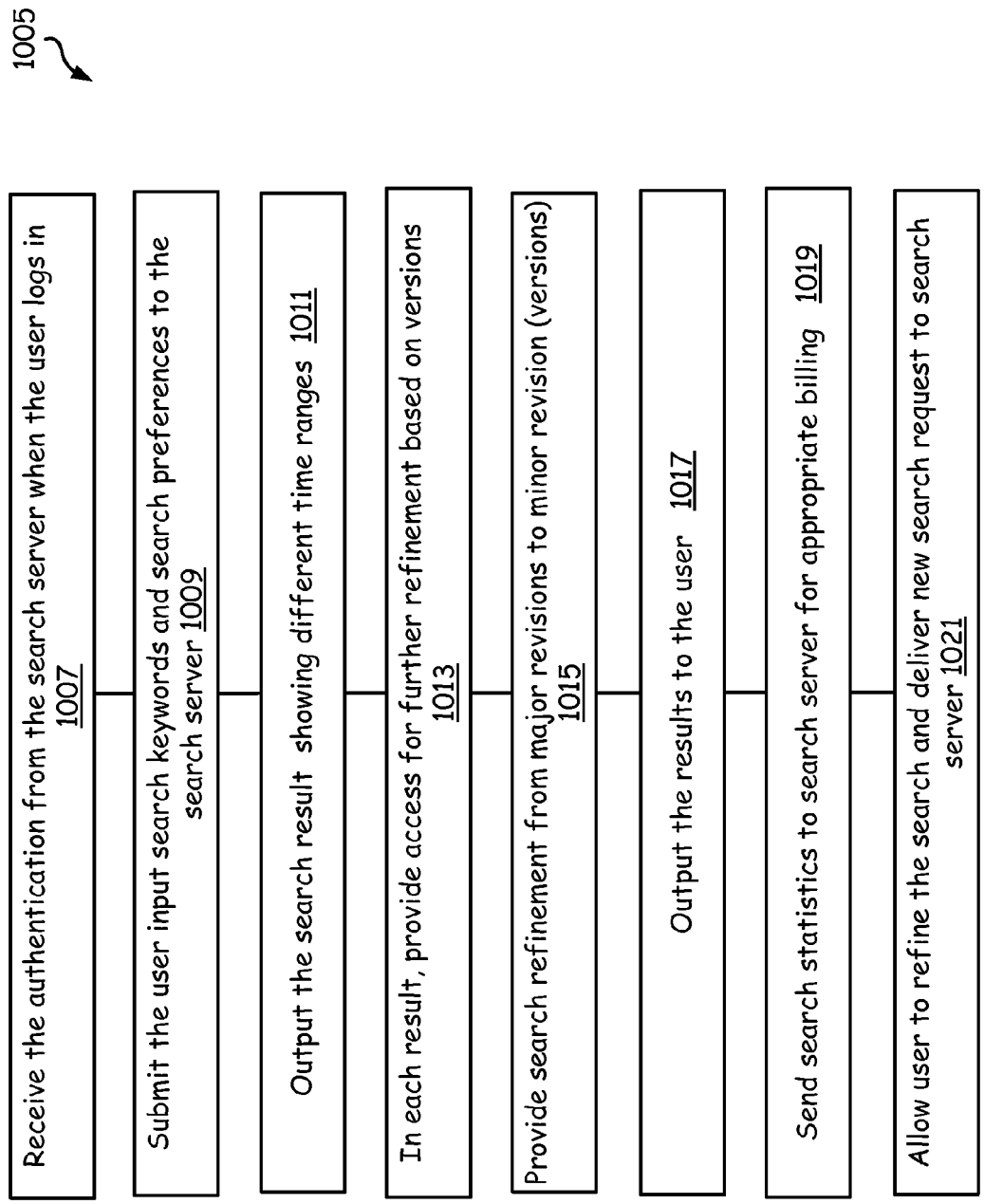
FIG. 10 is a method flow diagram illustrating various steps that network browser uses to search different timelines of historical Internet data and/or different versions of the timed window data.

FIG. 10 is a method flow diagram 1005 illustrating various steps that network browser provide to search from different timelines of historical Internet data to different versions of those timed window data. The method begins at a block/step 1007 where the network browser receives authentication form the search server upon the user's log in operation. At a next block/step 1009, the browser submits the user input search string(s) along with the search criteria (if any is provided) to the search server. The search criteria are as discussed in the previous FIG. 8. The browser, with the help of the historical Internet toolbar at a block/step 1011, outputs various timeline data of the search results to the user. For each timeline of the result obtained, the network browser further allows for refinement of search for different versions at a next block/step 1013. The search results obtained at the block/step 911 are further refined to different timeline information at the block/step 913. At a next block/step 1015, the network browser window allows the user to further refine the search from major revisions of the webpage to minor revisions. For example, the refinement in the search could be the user selecting the version 2.2 minor revisions from the major revision 2.0. With these major and minor timing/version refinements, at a next block/step 1017, the search results are output on the network browser window for user viewing. The search options and various statistics of the searches conducted are monitored by the network browser, and appropriate billing is obtained from the search server at a next block/step 1019. The browser allows the viewer of search results to step through different minor versions of search results from different major versions of search results for a specific timeline window of data. Once the results are delivered, the browser may send new search requests to the search server at a next block/step 1021 using the historical data Internet toolbar.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description, and can be apportioned and ordered in different ways in other embodiments within the scope of the teachings herein. Alternate boundaries and sequences can be defined so long as certain specified functions and relationships are appropriately performed/present. Any such alternate boundaries or sequences are thus within the scope and spirit of the claimed invention.

The present invention has been described above with the aid of functional building block/steps illustrating the performance of certain significant functions. The boundaries of these functional building block/steps have been arbitrarily defined for convenience of description. Alternate boundaries could be defined as long as the certain significant functions are appropriately performed. Similarly, flow diagram block/steps may also have been arbitrarily defined herein to illustrate certain significant functionality. To the extent used, the flow diagram block/step boundaries and sequence could have been defined otherwise and still perform the certain significant functionality. Such alternate definitions of both functional building block/steps and flow diagram block/steps and sequences are thus within the scope and spirit of the claimed invention.

One of average skill in the art will also recognize that the functional building block/steps, and other illustrative block/steps, modules and components herein, can be implemented as illustrated or by discrete components, application specific integrated circuits, processors executing appropriate software and the like or any combination thereof. Although the Internet is taught herein, the Internet may be configured in one of many different manners, may contain many different types of equipment in different configurations, and may replaced or augmented with any network or communication protocol of any kind.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A client device configured to implement a network browser, the network browser supporting accessing of web pages and documents from a network that contains at least one search server, the client device comprising:

an interface configured to send a search request from the network browser to a search server, the search server responds to the search request by selecting a plurality of historical instances of a document from a historical data repository based upon correlation with the search request and user search preferences, wherein each of the plurality of historical instances of the document is associated with both a time-stamp and a version identifier, wherein the version identifier identifies a version based on at least one criterion unrelated to time;

a network browser including a historical data module, the historical data module configured to receive, in response to a search request, the plurality of historical instances of the document;

the network browser configured to present the plurality of historical instances based on version identifiers or in time order based on time stamps, depending on user input to the network browser, wherein the version order presents the plurality of historical instances in a manner that enables a user to cycle through different historical instances of the document based on the version identifier; and wherein the time order presents the plurality of historical instances in a manner that enables a user to cycle through different historical instances of the document based on the time-stamp.

2. The client device of claim 1, the user search preferences are selected from a group consisting of:
a preference to search information from a specific web site;
a preference to search from favorites of the network browser; and
a preference to search using recent browser activity.

3. The client device of claim 1, the network browser further configured to restrict the plurality of historical instances of the document presented to instances having both a time-stamp within a user-desired time range and a distinct version identifier.

4. The client device of claim 1, the network browser further configured to automatically forward requests to the search server to perform search operations based on a current geographical location of the user.

5. The client device of claim 1, the network browser further configured to enable a historical search interface to be installed within the network browser for obtaining historical instances of the document.

6. The client device of claim 1, the search request including a range of times to which the time-stamps of each of the plurality of historical instances of the document must correlate, the range of times including a start date and an end date.

7. The client device of claim 6, wherein:
the start date and end date can be incremented or decremented to enable user browsing through different time ranges of historical instances of the document, and
different minor and major version identifiers of the document may be processed to enable user browsing through different version identifiers.

8. The client device of claim 7, the network browser further configured to enable the user to switch interchangeably between browsing historical instances of the document by incrementing or decrementing date information and browsing historical instances of the document by processing different minor version identifiers and major version identifiers.

9. The client device of claim 1, the network browser further configured to enable the user to increment or decrement a view of one of the historical instances of the document to browse through different historical instances of the document in steps for major version identifiers and minor version identifiers.

10. The client device of claim 1, the network browser further configured to provide options for refining a search between a time order search process and a version order search process.

11. The client device of claim 1, the network browser further configured to enable the user to register and sign in with the search server to enable a historical toolbar search interface within the network browser to send the search request to the search server.

12. The client device of claim 1, the network browser further configured to include a historical search toolbar that can be downloaded and integrated on to the network browser, wherein certain fees may be processed when the user is using the historical search toolbar to find historical instances of a document.

13. The client device of claim 12, wherein the historical search toolbar includes options for inputting a search string; choosing user search preferences; logging onto a specific search server; and navigating different historical instances of a document having different time-stamps or version identifiers.

14. A method for obtaining a historical search result over a network, the method comprising:
delivering search information to a search server to select a historical search result that is unavailable from a search of current network content, but is available from a historical data repository, the search information including a search string;
receiving and presenting, to a user, a plurality of versions of the historical search result, wherein each version of the historical search result is associated with a version identifier established based on at least one criterion unrelated to time, and each version having a distinct revision of the historical search result;
presenting an interface that enables the user to cycle sequentially between views of various versions of the historical search result by enabling the user to access a particular one of the plurality of versions and then move sequentially to a next one of the plurality of versions; and
presenting, within the interface, a pop-up interface that enables the user to restrict the presented plurality of versions of the historical search result to versions having time-stamps within a user-defined range of time.

15. The method of claim 14 comprising:
receiving registration information from the user, the registration information including the user's name, address, desired login name, and password;
in response to receiving the registration information, sending the registration information to the search server;
receiving a download of a historical search interface, the historical search interface is installed in association with a browser by the search server;
presenting the historical search interface to enable the user to perform historical search operations to find historical search results that were once on the network.

16. The method of claim 15, comprising:
receiving registration information from the user, the registration information including method of payment information with the search server; and
presenting the historical search interface to enable the user to pay for historical search operations.

17. The method of claim 15, wherein the historical search interface enables the user to enter user preferences, the user preferences are selected from a group consisting of: to search information from a specific web site; to search information from favorites of the browser; and to search information using recent browser activity indicators.

18. A method performed by a historical data support module in a network browser that supports displaying of historical web pages, the method comprising:

receiving authentication from search server in response to a user login;

sending at least one search request to the search server, the search request requesting historical web pages, the historical web pages previously stored locally to the search server and currently stored in a historical data repository;

in response to the sending at least one search request, receiving and displaying an arrangement of instances of a historical web page, the instances arranged sequentially as a timeline corresponding to a time-stamp associated with each instance;

presenting a browser interface that enables the user to cycle sequentially between views of various instances by enabling the user to access a particular instance then move sequentially to a view of a next instance in the timeline;

presenting, within the browser interface, a pop-up interface that enables the user to restrict the instances displayed in the timeline to instances including a selection of distinct revisions of the historical web page;

the browser interface enables the user to interchangeably switch between searching the historical web pages by timeline arrangement of instances and searching the historical web pages by distinct, non-time-related revisions of the historical web page;

sending search information to the search server for billing; and aggregating and processing billing information for the user.

19. The method of claim 18, wherein the billing includes processing of search statistics, and wherein the search statistics allow a server to obtain a price to charge for searching.

20. The method of claim 18, further comprising:

performing a search analysis to track a selected variation of the historical web page over a specified period of time; and displaying the selected variation to the user to enable the user to improve his browsing operations on the historical data.

\* \* \* \* \*